United States Patent Office 2,879,186
Patented Mar. 24, 1959

2,879,186

PROCESS FOR BLANCHING ZIRCONIUM

Wolfgang Fischer, Essen, Germany, assignor to Aktiengesellschaft für Unternehmungen der Eisen- und Stahlindustrie, Essen, Germany No Drawing. Application June 7, 1957
Serial No. 664,191

Claims priority, application Germany June 9, 1956

12 Claims. (Cl. 134—3)

This invention relates to a process for blanching zirconium in order to remove from the surface of this metal layers of scale which are produced during the working thereof.

The invention relates more particularly to a process for producing blanched zirconium material suitable to be used, for instance, in atomic reactors.

The principal processes for blanching zirconium, which are known in the art, are those envolving a mechanical treatment for removing the scale layers from the metal surface by sand blasting, shrubbing, polishing and the like. These processes are expensive, uneconomical, and often impracticable depending on the shape of the zirconium metal object to be treated.

The only chemical treatment thus far known in the art, which consists of blanching the scale-covered zirconium metal layers with hydrofluoric acid, is unsatisfactory because it permits to remove only oxide layers which have been produced on the zirconium metal surface by working at low temperatures of, for instance, up to about 650° C.

The scale layers which consist mainly of zirconium oxide $ZrO_2$ can only be removed with great difficulty, when originated at higher temperature, i.e. above 650° C. probably, because of sintering and recrystallization effects occurring in these layers.

It is particularly difficult to remove those oxide scales on zirconium metal which are formed when the latter is hot-rolled.

The sodium hydride process which has been applied successfully to titanium, remains ineffective when applied to zirconium covered with high temperature generated oxide layers. Furthermore, sodium hydride must be applied over a time of at least 5 to 10 minutes, during which period the hydrogen is dissolved by the zirconium and makes the same brittle, even before a low temperature generated scale layer has been removed. Neither is it possible to remove the scale layers on zirconium by treatments with molten alkali metal hydroxides, boiling sulfuric acid, or boiling phosphoric acid.

It is, therefore, an object of my invention to provide a process for blanching zirconium metal surface with a view to clean the same by the removal of scale layers therefrom, which process is simple, quick, efficient and economical.

It is, furthermore, an object of my invention to provide a chemical treatment of such zirconium metal objects which have been covered with scale due to being worked, at low as well as at high temperatures, which treatment permits to remove the scale and clean the zirconium metal surfaces in a simple, quick, efficient and economical manner.

These objects are attained and the drawbacks of the known chemical and mechanical treatments are avoided by the process of my invention which comprises the removal of scale layers from zirconium metal surfaces by blanching the same with a fusible acid alkali metal salt of hydro-fluoric acid or a fusible mixture of several metal hydrogen fluorides. I have found that the hydrogen fluorides, or bifluorides, of alkali metals are very efficient for the aforesaid purpose, and I prefer for economical reasons, as well as due to its particular efficiency among the more economical alkali metal compounds, to use potassium hydrogenfluoride $KHF_2$ having a melting point of about 240° C.

Moreover, I have discovered that the molten alkali metal hydrogen fluoride salts (or acid fluoride salts), and in particular those just mentioned, are completely satisfactory in removing from zirconium metal surfaces even those scale layers which have been formed on the metal at high temperatures, for instance in the order of from 650° C. upward.

I prefer to prepare a molten bath of the hydrogen fluoride salt, the temperature of which is not substantially above the melting point of the salt, because at higher temperatures the hydrogen fluoride salt would begin to dissociate cleaning off gaseous hydrofluoric acids.

In the case of potassium hydrogen fluoride a treatment of only one minute at a temperature of 300° C., i.e. only about 60° above the melting point of the salt, has usually been sufficient to completely remove the oxidic scale layers of zirconium metal.

It is preferable to dip the zirconium object to be blanched, into the acid fluoride bath only for such a length of time as is necessary to dissolve the scale layer from the object, and as the reaction in the bath can be approximately described by the equation

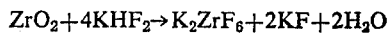

$$ZrO_2 + 4KHF_2 \rightarrow K_2ZrF_6 + 2KF + 2H_2O$$

For the gaseous hydrogen developed during the reaction in the bath between the molten salt and the free zirconium surface, which reaction begins as soon as the scale layer has been completely removed and follows approximately the equation

$$Zr + 4KHF_2 \rightarrow K_2ZrF_6 + 2KF + 2H_2$$

leads to an alloying of the zirconium metal with small quantities of hydrogen that cause the metal to become brittle.

The length of immersion of a zirconium object or the dipping of a surface thereof into the alkali or similar metal hydrogen fluoride salt melt therefore depends on the degree of scale formation, i.e. primarily the thickness and consistency of the scale layer on the zirconium metal surface, thicker and tougher layers requiring naturally a longer treatment.

After the zirconium object has been sufficiently blanched and withdrawn from the salt melt, it is rinsed with water. The blanched surfaces of the zirconium object are usually already clean. If this is not yet so, a further blanching step may follow consisting of a short treatment with diluted hydrofluoric acid of 2+5% by volume, or with diluted hydrofluoric acid to which concentrated nitric acid has been added.

According to a further feature of my invention, oxidizing agents such as permanganate salts, nitrates, or dichromates, preferably in the form of potassium salts, may be added to the metal bifluoride bath. This is especially recommendable if the formation of scale on the zirconium metal surfaces is excessive.

I have also found that, while nickel, iron, or nickel-copper alloy vessels are suitable for preparing the bifluoride melt therein, vessels of pure copper metal are still better and I prefer to use them for this purpose.

While sodium bifluoride has a relatively low heat dissociation temperature of 270° C. and does therefore not permit to form a satisfactory bath cesium bifluoride is particularly suitable, where small zirconium objects having a relatively strongly adherent oxide layer are to be cleaned, because the dissociation temperature of $CsHF_2$ is between 500° and 600° C. and the melting point is about 150° C., and the bath temperature can be correspondingly high.

The invention will be more fully understood by the following examples, which are, of course, not to be considered as limiting the scope of the invention.

*Example I*

Scale-covered zirconium metal parts are dipped for about 15 seconds to 1 minute into a bath of molten potassium bifluoride having a temperature of about 300° C. The length of immersion depends on the degree of scale formation on the metal surfaces. The salt melt is contained in a copper vessel.

After removing the parts from the melt, they are rinsed with cold water and subjected to a second blanching in a solution of diluted hydrofluoric acid of 3% by volume.

*Example II*

Example I is repeated with a bath of molten sodium bifluoride in a nickel metal, and the second blanching is carried out with an aqueous mixture containing 20 volume percent of concentrated nitric acid and 5 volume percent of a 40 percent weight/volume hydrofluoric acid. The length of immersion is from 25 seconds to 75 seconds depending on the strength of the scale layer on the zirconium metal.

*Example III*

The treatment of Example I is carried out with a salt melt to which 1% weight/volume of potassium permanganate has been added. The dipping time is only a few (5–20 or less) seconds.

*Example IV*

The same treatment as in Example III is carried out with 3% weight/volume of potassium nitrate as the adjuvant. The dipping period is about the same (5–30 seconds) depending on the strength of the scale layer. The treatment was carried out in an iron vessel.

*Example V*

The same treatment as in Examples III and IV is carried out with 2% weight/volume potassium dichromate as the adjuvant to the salt melt. The dipping time is the same as in these examples.

*Example VI*

Small zirconium metal objects covered by a scale layer that has been caused by hot rolling at temperature of about 800° C., are dipped for about 15 seconds to 2 minutes (depending on the degree of oxidation of the objects) into a melt of cesium bifluoride $CsHF_2$ at about 400° C. They are subsequently treated in the manner described in Example I.

Zirconium metal objects must be free from any scale layers in particular when used in the construction of atomic reactors and the like. Zirconium sheet metal and pipes are, for instance, used as the canning material for the fuel elements of fission reactors and must be free from zirconium oxide scale.

It will be understood that this invention is susceptible to further modification and, accordingly, it is desired to comprehend such modifications within this invention as may fall within the scope of the appended claims.

What I claim is:

1. A process for cleaning zirconium metal surfaces by removing scale layers therefrom, comprising the steps of preparing a molten bath of an alkali metal hydrogen fluoride salt and dipping therein the surface to be cleaned.

2. A process for cleaning zirconium metal surfaces by removing scale layers therefrom, comprising the steps of preparing in an iron vessel a molten bath of an alkali metal hydrogen fluoride salt and dipping therein the surface to be cleaned.

3. A process for cleaning zirconium metal surfaces by removing scale layers therefrom, comprising the steps of preparing in a nickel vessel a molten bath of an alkali metal hydrogen fluoride salt and dipping therein the surface to be cleaned.

4. A process as described in claim 1, characterized in that the metal hydrogen fluoride salt is potassium bifluoride.

5. A process for cleaning zirconium metal surfaces by removing scale layers therefrom, comprising the steps of preparing a molten bath of an alkali metal hydrogen fluoride salt having a temperature somewhat above the melting point of the salt and below the dissociation temperature thereof, and dipping therein the surface to be cleaned.

6. A process for cleaning zirconium metal surfaces by removing scale layers therefrom, comprising the steps of preparing a molten bath of an alkali metal hydrogen fluoride salt having a temperature above the melting point of the salt and up to about 400° C., and dipping therein the surface to be cleaned.

7. A process for cleaning zirconium metal surfaces by removing scale layers therefrom, comprising the steps of preparing a molten bath of an alkali metal hydrogen fluoride salt and dipping therein the surface to be cleaned for a minimum length of time sufficient to remove said scale layers therefrom.

8. A process for cleaning zirconium metal surfaces by removing scale layers therefrom, comprising the steps of preparing a molten bath of an alkali metal hydrogen fluoride salt, adding an oxidizing agent selected from the group consisting of alkali metal permanganates, alkali metal bichromates, and alkali metal nitrates to the bath, and dipping therein the surface to be cleaned.

9. A process for cleaning zirconium metal surfaces by removing scale layers therefrom, comprising the steps of preparing a molten bath of an alkali metal hydrogen fluoride salt and dipping therein the surface to be cleaned, withdrawing the blanched surfaces from the bath, rinsing the same with water and subjecting them to a secondary blanching with a diluted hydrofluoric acid solution.

10. A process for cleaning zirconium metal surfaces by removing scale layers therefrom, comprising the steps of preparing a molten bath of an alkali metal hydrogen fluoride salt and dipping therein the surface to be cleaned, withdrawing the blanched surfaces from the bath, rinsing the same with water and subjecting them to a secondary blanching with a diluted hydrofluoric acid solution, containing a mixture of nitric acid.

11. A process for cleaning zirconium metal surfaces by removing scale layers therefrom, comprising the steps of preparing in a copper vessel a molten bath of an alkali metal hydrogen fluoride salt and dipping therein the surface to be cleaned.

12. A process for cleaning zirconium metal surfaces by removing scale layers therefrom, comprising the steps of preparing in a nickel-copper alloy vessel a molten bath of an alkali metal hydrogen fluoride salt and dipping therein the surface to be cleaned.

References Cited in the file of this patent

UNITED STATES PATENTS

| | | |
|---|---|---|
| 2,711,364 | Beach et al. | June 21, 1955 |
| 2,711,389 | Beach et al. | June 21, 1955 |